United States Patent
Xu (10) Patent No.: US 11,295,155 B2
(45) Date of Patent: Apr. 5, 2022

(54) ONLINE TRAINING DATA GENERATION FOR OPTICAL CHARACTER RECOGNITION

(71) Applicant: KONICA MINOLTA BUSINESS SOLUTIONS U.S.A., INC., San Mateo, CA (US)

(72) Inventor: Ting Xu, Campbell, CA (US)

(73) Assignee: KONICA MINOLTA BUSINESS SOLUTIONS U.S.A., INC., San Mateo, CA (US)

(*) Notice: Subject to any disclaimer, the term of this patent is extended or adjusted under 35 U.S.C. 154(b) by 209 days.

(21) Appl. No.: 16/843,811

(22) Filed: Apr. 8, 2020

(65) Prior Publication Data
US 2021/0319246 A1 Oct. 14, 2021

(51) Int. Cl.
*G06K 9/62* (2006.01)
*G06K 15/02* (2006.01)
(Continued)

(52) U.S. Cl.
CPC ........... *G06K 9/344* (2013.01); *G06K 9/6256* (2013.01); *G06K 15/1827* (2013.01);
(Continued)

(58) Field of Classification Search
CPC .. G06K 9/344; G06K 9/6256; G06K 15/1827; G06K 15/1835; G06K 2209/011;
(Continued)

(56) References Cited

U.S. PATENT DOCUMENTS 10,489,682 B1 * 11/2019 Kumar .................... G06K 9/18
10,755,183 B1 * 8/2020 Livshitz ................ G06F 40/131
(Continued)

FOREIGN PATENT DOCUMENTS

CN 103679208 A 3/2014
CN 108681735 A 10/2018
(Continued)

OTHER PUBLICATIONS

Siddiqua et al. ("Recognition of Kannada Characters in Scene Images using Neural Networks," Fifth International Conference on Image Information Processing; Date of Conference: Nov. 15-17, 2019) (Year: 2019).*

(Continued)

*Primary Examiner* — Yubin Hung
(74) *Attorney, Agent, or Firm* — Squire Patton Boggs (US) LLP (57) ABSTRACT

A method and system to generate training data for a deep learning model in memory instead of loading pre-generated data from disk storage. A corpus may be stored as lines of text. The lines of text can be manipulated in the memory of a central processing unit (CPU) of a computing system, using asynchronous multi-processing, in parallel with a training process being conducted on the system's graphics processing unit (GPU). With such an approach, for a given line of text, it is possible to take advantage of different fonts and different types of image augmentation without having to put the images in disk storage for subsequent retrieval. Consequently, the same line of text can be used to generate different training images for use in different epochs, providing more variability in training data (no training sample is trained on more than once). A single training corpus may yield many different training data sets. In one aspect, the model being trained is a deep learning model, which may be one of several different types of neural networks. The training enables the deep learning model to perform OCR on line images.

20 Claims, 7 Drawing Sheets

(51) Int. Cl.
| | |
|---|---|
| *G06K 9/34* | (2006.01) |
| *G06T 7/11* | (2017.01) |
| *G06T 3/00* | (2006.01) |
| *G06T 5/00* | (2006.01) |
| *G06T 1/20* | (2006.01) |

(52) U.S. Cl.
CPC ............ *G06K 15/1835* (2013.01); *G06T 1/20* (2013.01); *G06T 3/0006* (2013.01); *G06T 5/002* (2013.01); *G06T 7/11* (2017.01); *G06K 2209/011* (2013.01); *G06T 2207/20081* (2013.01); *G06T 2207/20132* (2013.01)

(58) Field of Classification Search
CPC ......... G06T 1/20; G06T 3/0006; G06T 5/002; G06T 7/11; G06T 2207/20081; G06T 2207/20132
See application file for complete search history.

(56) References Cited

U.S. PATENT DOCUMENTS

| | | | |
|---|---|---|---|
| 2010/0246963 A1* | 9/2010 | Al-Muhtaseb | G06K 9/6297 382/185 |
| 2014/0278353 A1* | 9/2014 | Herdagdelen | G06F 40/40 704/9 |
| 2018/0082146 A1* | 3/2018 | Krivopaltsev | G06K 9/00442 |
| 2018/0150448 A1* | 5/2018 | Gupta | G06F 40/295 |
| 2020/0097818 A1* | 3/2020 | Li | G06N 3/0481 |
| 2020/0311459 A1* | 10/2020 | Zagaynov | G06N 3/08 |
| 2020/0372395 A1* | 11/2020 | Mahmud | G06N 3/0454 |
| 2021/0217215 A1* | 7/2021 | Sousa | G06T 11/60 |

FOREIGN PATENT DOCUMENTS

| | | | |
|---|---|---|---|
| CN | 109492233 A | * | 3/2019 |
| JP | 2019197336 A | * | 11/2019 |

OTHER PUBLICATIONS

Namysl et al. ("Efficient, Lexicon-Free OCR using Deep Learning," International Conference on Document Analysis and Recognition; Date of Conference: Sep. 20-25, 2019) (Year: 2019).*

Mamun et al. ("Bangla Handwritten Digit Recognition Approach with an Ensemble of Deep Residual Networks," International Conference on Bangla Speech and Language Processing; Date of Conference: Sep. 21-22, 2018) (Year: 2018).*

Yousef et al. ("Accurate, Data-Efficient, Unconstrained Text Recognition with Convolutional Neural Networks," arXiv:1812.11894, Dec. 31, 2018) (Year: 2018).*

* cited by examiner

FIG. 1A    FIG. 1B

Asia Pacific is expected to witness a remarkable CAGR of 16.7% from 2019 to 2025.

FIG. 2A

Asia Pacific is expected to witness a remarkable CAGR of 16.7% from 2019 to 2025.

FIG. 2B

CAGR of 16.7%

Asia Pacific is expected to from 2019 to 2025.

witness a remarkable

FIG. 2C

CAGR, of 16.7%

Asia Pacific, is expected to from 2019 to 2025., witness a remarkable

FIG. 2D

Asia Pacific, is expected to from 2019 to 2025., witness a remarkable

CAGR, of 16.7%

FIG. 2E

ASIA PACIFIC, is   expected   to

From 2019 to 2 0 2 5., witness a    remarkable.

ASIA PACIFIC, is expected to

From 2019 to 2025., witness a remarkable.

CAGR, of 16.7%

ONLINE TRAINING DATA GENERATION FOR OPTICAL CHARACTER RECOGNITION

BACKGROUND OF THE INVENTION

Aspects of the present invention relate to generating training data in central processing unit (CPU) memory at the time of training a machine learning model for Optical Character Recognition (OCR).

When training a model such as a deep neural network to recognize characters in a line image, a large amount of training data (millions of examples) are required in order to handle a sufficiently wide variety of scanned images accurately. There need to be enough training data to prevent model overfitting, which can happen when data fits too closely to a limited set of data points.

There can be great visual variability in character sets, though for different reasons. For example, for a Latin based language such as English, French, or Spanish, different font families and styles can number in the hundreds. For other languages, such as Hebrew, Arabic, Hindi, Pakistani, Vietnamese, German, Greek, or Slavic languages (including Russian, Ukrainian, and others), the number may be similar or may differ, depending on the number of letters in the alphabet, the presence of upper or lower case, and the number of fonts, among other things. This listing of alphabets is intended to be exemplary and not exhaustive; ordinarily skilled artisans will appreciate that there may be other similarly situated alphabets. The number of characters in the alphabet, and the number of fonts, together yield a substantial amount of visual variability to be accounted for. For some Asian languages (for example, Chinese, Japanese, and Korean (CJK)), the number of different characters is huge (thousands). Though there are fewer fonts, the characters plus fonts likewise yield substantial visual variability. In such cases, producing proper training data has been challenging because of the time involved and the amount of disk (i.e. hard disk or solid state disk) storage required. In an embodiment, the disk storage may be an example of non-volatile storage.

There have been attempts to use synthetic training data, which is generated by rendering selected fonts and then storing the rendered fonts before loading them into a training procedure. This synthetic training method works well up to a point. However, when the amount of training data reaches millions, the time to generate the necessary images, and the disk storage required, become substantial and even prohibitive.

Image augmentation can introduce visual variability into training sets. However, the resulting offline images are static, in the sense that the resulting contents in the selected font (including font family, font size, and font style) are fixed. A great deal of time and disk storage are required in order to generate all of the combinations of available content and fonts, not to mention the variety of common image augmentation procedures, with which ordinarily skilled artisans will be familiar It would be desirable to provide online training data that do not require substantial disk storage, and can be used in real time, in CPU memory, to train a machine learning model.

SUMMARY OF THE INVENTION

Aspects of the present invention provide a method and system to generate training images in memory instead of loading pre-generated data from disk storage, at the time of training of a deep learning model. In one aspect, this online generation is carried out in the central processing unit (CPU) of a computing system, using asynchronous multi-processing, in parallel with the training process being carried out in a training model in the system's graphics processing unit (GPU). With such an approach, the amount of overhead is reduced, because it no longer is necessary to access disk storage, with the attendant input/output (I/O). Another advantage is that, for a given line of text, being able to use different fonts and different types of image augmentation on that text without having to put images in disk storage for subsequent retrieval, makes it possible to use same line of text to generate different training images for use in different epochs. As a result, aspects of the inventive method provide more variability in training data (no training sample is trained on more than once). The method can be effective in training for recognition of images of lines of text in complex languages such as Japanese. Japanese is a good example, because use cases can include all the characters used in English (Roman, digits, special characters), plus Hiragana, full-width Katakana, half-width Katakana, Japanese punctuation, and thousands of Kanji characters originating in the Chinese language. But aspects of the invention are applicable to facilitate OCR in any language or alphabet.

In an embodiment, a text-based training corpus can provide a source for training data by manipulation of the corpus in a manner to be described, so that a single training corpus may yield many different training data sets. In one aspect, the training model is a deep learning model, which may be one of several different types of neural networks. The training enables the deep learning model to perform OCR on line images (that is, an image with a single line of text).

BRIEF DESCRIPTION OF THE DRAWINGS

Aspects and embodiments of the invention now will be described in detail with reference to the accompanying drawings, in which.

DETAILED DESCRIPTION

Aspects of the invention involve storage of a corpus as text sentences whose fonts and other characteristics can be manipulated in CPU memory to create minibatches for use in training a machine learning model for OCR. The ability to take standard text and manipulate it in a wide variety of ways allows effectively for a much larger training corpus from a smaller corpus, making a much larger number of training examples out of a smaller number.

Figure 1A:
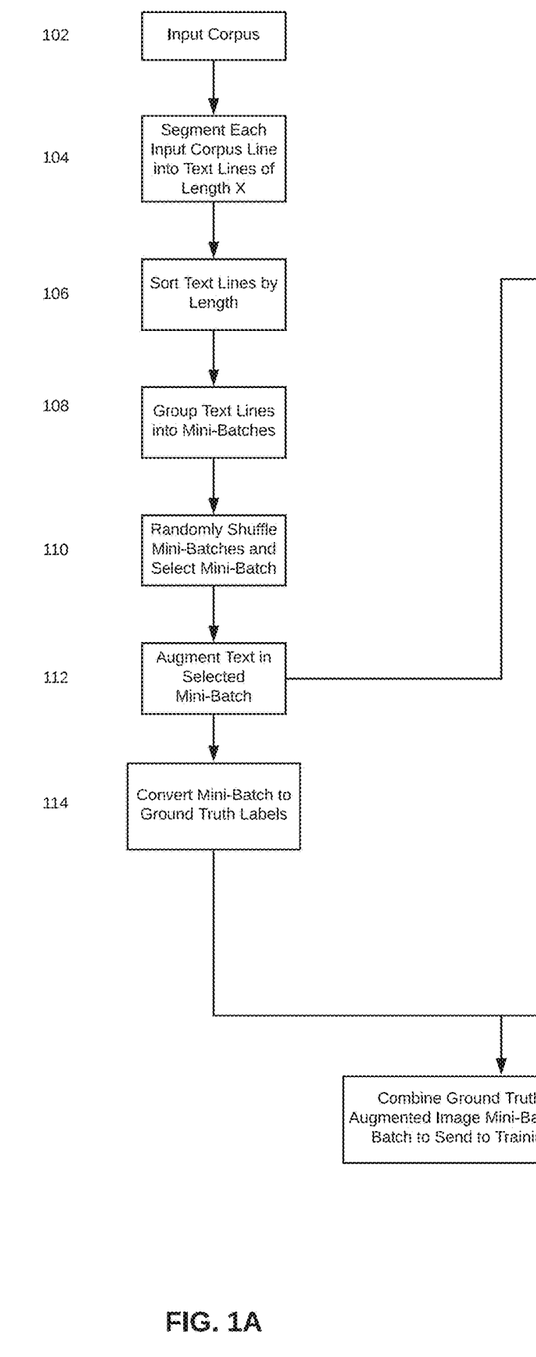
FIGS. 1A and 1B show general flow according to an embodiment.
Figure 1B:
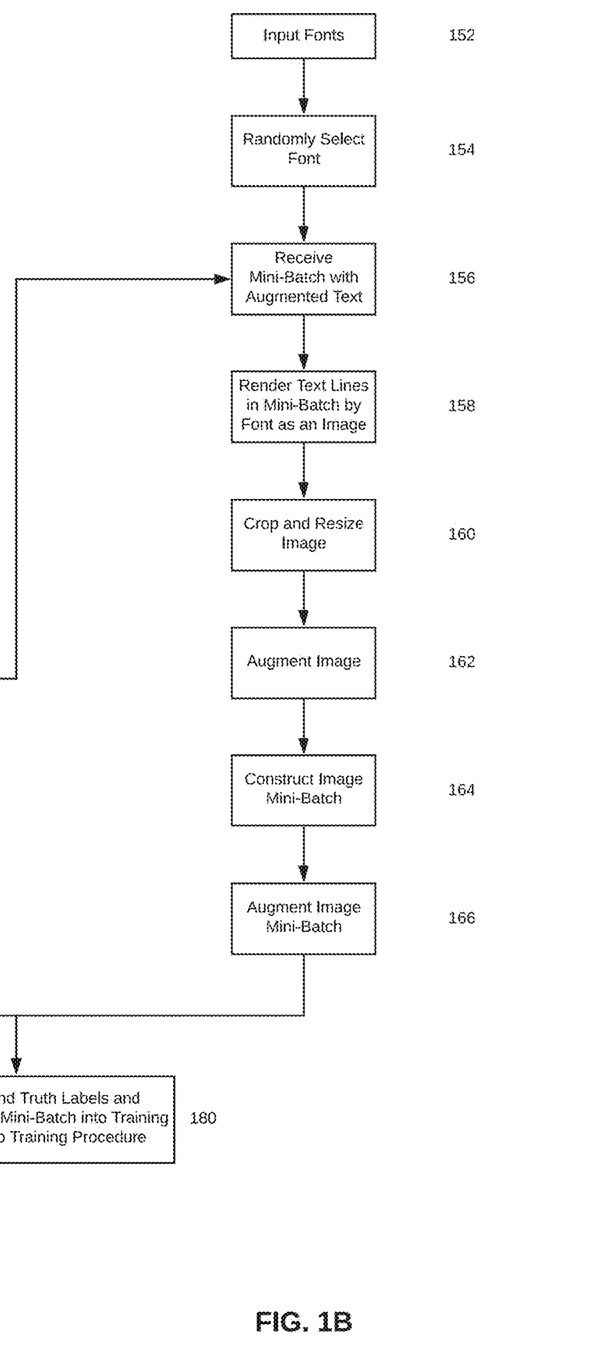

FIGS. 1A and 1B are flow charts to describe the formulation of training sets according to an embodiment. The training sets include, among other things, the following:

Fonts: Font files will be used to render text as training images for model training. Stored text can be rendered in numerous different fonts. For Latin languages, for example, there are many different fonts, for a relatively small number of characters. For CJK languages, there may be fewer fonts because of the nature of the character set, but the character set is much larger than in Latin languages.

Rendering Alphabet: This would be the set of all possible characters in online-generated line images. The collected fonts must be able to render all characters in the rendering alphabet. Such an alphabet often is a superset of a Model Alphabet (as will be discussed below). In an embodiment, the Rendering Alphabet may be the same size as the Model Alphabet. In an embodiment, the characters used for rendering images are converted to corresponding images (per the merging process described below) in the Model Alphabet as ground truth labels.

Model Alphabet: This would be the set of characters that the model can recognize or output. The Model Alphabet often is a subset of the Rendering Alphabet. Because some characters are hard for a machine learning model to distinguish, in an embodiment such characters may be merged into a single recognizable class. For example, all English letters have both half-width (in ASCII range) and full-width version (in CJK range) in the Unicode specification. A letter 'X' (code point 0x58) and 'X' (code point 0xFF38) may be visually indistinguishable in certain fonts, even to human eyes, and their semantic meanings would be the same. In this event, such characters usually are merged into one single class (either ASCII or CJK; for purposes of embodiments of the invention, the selected class is not important). There may be other valid reasons for such a merger, depending on the application. For example, the multiplication operator and lowercase "x" may look very similar in many fonts. In such a circumstance, only "x" would be included in the Model Alphabet, though both the multiplication operator and lowercase "x" may be in the Rendering Alphabet. As a result, the Model Alphabet would contain the consolidated alphabet, while the Rendering Alphabet may have additional symbols that are similar in appearance and/or semantic meaning.

Training Corpus: This would be a large amount of targeted natural language text (with all characters belonging to the rendering alphabet). Characters not in the Rendering Alphabet may be removed.

Maximum Line Length: This would be a maximum number of characters that can be recognized in a line.

Figure 2A:
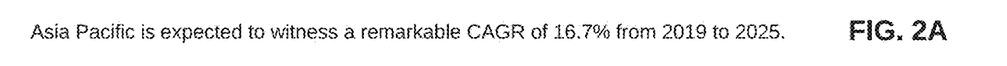
FIG. 2A shows a line of text.

Looking now at FIG. 1A, at 102 a corpus of text may be input. In an embodiment, a corpus may contain one or two million or more natural language sentences or paragraphs. In one aspect, it may be desirable to limit the number of characters in the corpus. For Latin alphabets, this is easy to do, because the alphabets themselves are not very large, relatively speaking. For CJK languages, limiting the number of characters in the corpus to more commonly used characters may be desirable. Thus, for example, while there are tens of thousands of Kanji characters, selecting a few thousand, along with Hiragana, Katakana, and Latin characters may be desirable for Japanese applications. The desired limit, or even the desired corpus, may depend on the application. For example, current languages and alphabets have evolved from older languages and alphabets. In an embodiment, using a different corpus for older documents than for newer ones may provide more effective training. For Latin alphabets, there have been changes over the last several hundred years. For CJK languages, different alphabet sets may be more relevant now than in the distant past. FIG. 2A shows an example of a line of text received from the corpus at 102.

It should be noted that the corpus being stored is in the form of text, not of images. Text takes less disk storage, often much less, than images do. In an embodiment, the corpus may be a public domain corpus, thereby avoiding confidentiality issues that may arise from using proprietary training data.

Figure 2B:
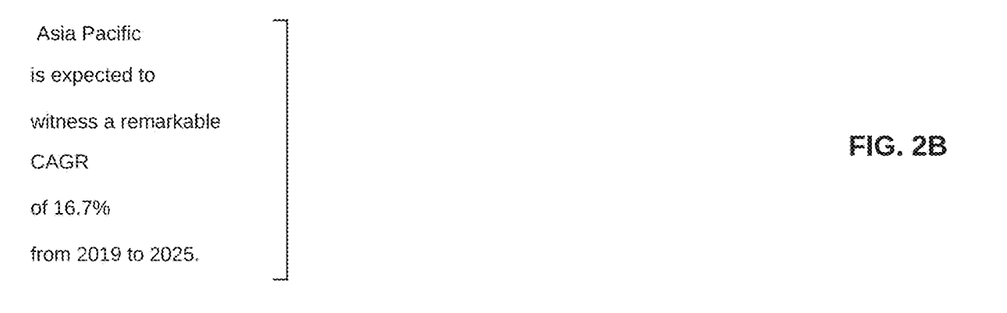
FIGS. 2B to 2G show generation of mini-batches as ground truth training data output according to embodiments.

At 104, one of the selected lines from the corpus (if more than one at a time is input) may be segmented into text lines. In an embodiment, the text lines should not exceed a maximum line length. In an embodiment, some of the text lines may have the same length. In an embodiment, the desired maximum line length may depend on available CPU and GPU speed and memory. The desired maximum line length may depend on the document or documents to undergo OCR, as documents often have a maximum line length. In an embodiment, keeping the maximum line length to a reasonable value may help the model to achieve a desired accuracy more readily. FIG. 2B shows an example of the segmenting of a line of text from the corpus into text lines.

Figure 2C:
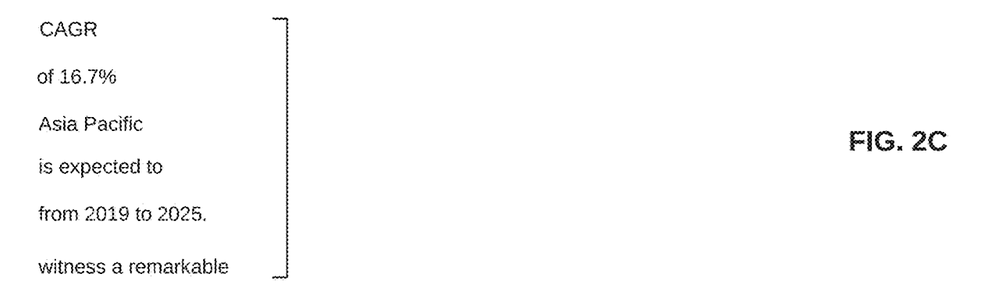

At 106, the segmented text lines may be sorted according to length, for example, from shortest to longest, or from longest to shortest. In an embodiment, grouping together lines of similar length may be desirable to reduce the amount of additional processing that may be required, for example, to reduce the number of background padding pixels that would be provided to give the lines the same image widths after the additional processing to be described. FIG. 2C shows an example of the sorting of the text lines by length.

Figure 2D:
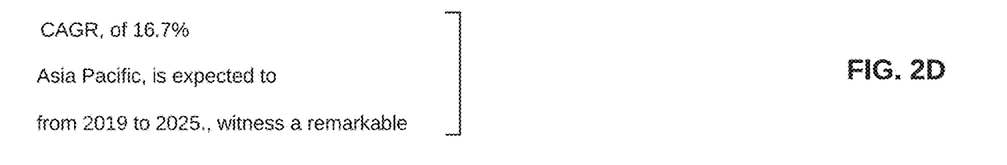

At 108, the sorted text lines may be grouped into mini-batches. For example, if there are twelve text lines, they may be grouped into six mini-batches of two text lines each, or four mini-batches of three text lines each, or three mini-batches of four text lines each, or two mini-batches of six text lines each. "Batch size" is a hyperparameter that defines a number of samples that a model is to work through before the model parameters are updated. FIG. 2D shows an example of the formation of mini-batches of the text lines. In FIG. 2C, there are six text lines, and FIG. 2D shows the grouping of those six text lines into three mini-batches of batch size two.

Figure 2E:
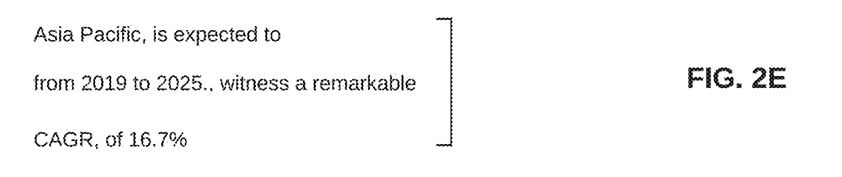

At 110, the mini-batches of grouped text lines may be shuffled to randomize them. In an embodiment, one of the mini-batches is selected from a sequence or series of mini-batches. By randomizing the order of the mini-batches, generalizability of the training model may be achieved more effectively. FIG. 2E shows an example of the shuffling of the mini-batches in FIG. 2D.

Figure 2F:
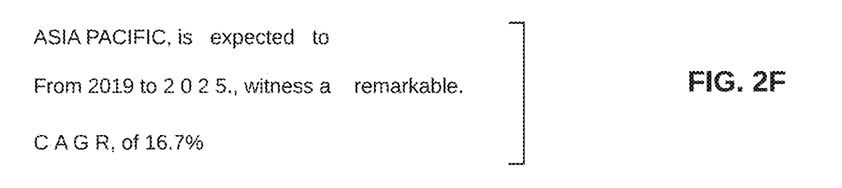

At 112, some or all of the text in the text line in the selected mini-batch may be augmented or changed to yield different rendering of the text as a result of different types of augmentation or change. For example, some text may be converted from upper case to lower case, or vice versa. Some text may be converted from full width to half width, or vice versa. For example, in Katakana, and Latin letters and digits in CJK languages, having full width or half width characters may be helpful in training. As another example of changing text appearance, a random number of white spaces may be inserted between letters or numbers or words, or the like. In an embodiment, diacritic marks may be added to or removed from certain letters in words. In an embodiment, all of the characters in these augmented text lines in the mini-batch may be in the Rendering Alphabet. This text augmentation listing is intended to be exemplary, not exhaustive. In one aspect, augmenting the text in this fashion can enhance the variability of content and, in some cases, the visual variability of the training samples. FIG. 2F shows an example of augmentation, with spaces inserted between some words, and some words being capitalized, and some half-width Latin characters converted to full-width. It should be noted that FIG. 2F shows all three mini-batches. One of these mini-batches will be selected at 112.

One effect of the foregoing actions is to take what otherwise would be a single sample and make a large number of samples. Each of these samples, when imaged in a manner to be discussed, will yield a different training sample for the training the machine learning model, all without having to retrieve a different sample from disk storage every time.

Figure 2G:
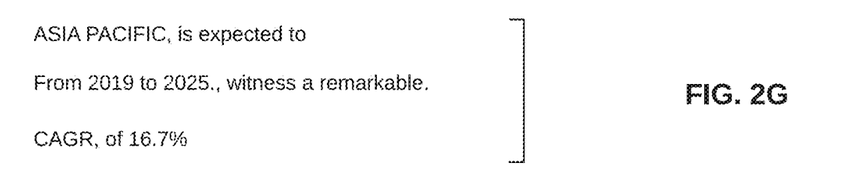

At 114, the changed or augmented text lines in the mini-batch may be converted to ground truth labels so that all of the ground truth labels are in the Model Alphabet. FIG. 2G shows an example of the ground truth labels that may be output, and sent to the training model.

Looking now at FIG. 1B, at 152 a variety of fonts may be input. The number and type of fonts may vary depending on lettering style, appearance and the like. For example, some Latin (English) fonts may have different appearances for letters like "a" and "g". Some fonts may have more curve or variability in appearance than others. For example, Courier, Arial, Comic Sans, Old English, and Handwriting fonts all may appear differently. Font size and font style (italic, bold, narrow, wide, thick) may be varied.

At 154, for a given line of text, a font may be selected at random, including its size and style. In this manner, each different line of text may be rendered with a different font.

Figure 3A:
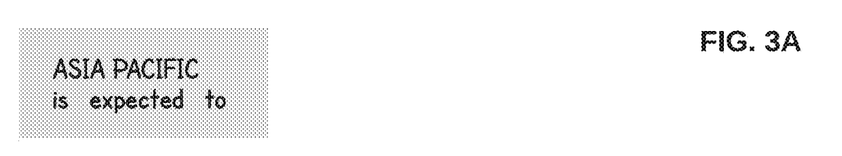
FIGS. 3A-3E show an example of sequential manipulation of data from one of the mini-batches from FIG. 2G as image training data according to embodiments.

At 156, after randomly selecting the font, the augmented text lines in the selected mini-batch from 112 (corresponding to what is shown in FIG. 2F) may be provided. At 158, the augmented text lines in that mini-batch may be rendered, with the selected font, as an image. In an embodiment, the text may be rendered on a sufficiently large blank image, or canvas, to ensure the ability to render all of the contents of the text lines. FIG. 3A shows an example of rendered text in an image, where the font is different, and the text is bold.

Figure 3B:
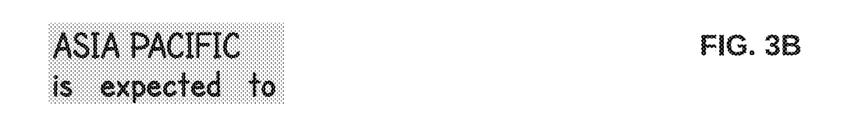

At 160, the image resulting from the application of the randomized font to the randomized augmented mini-batch may be cropped to remove borders, leaving only the text in the text lines. The image also may be resized to yield an image height that the training model expects. In an embodiment, the resizing may leave the aspect ratio of the image unchanged. FIG. 3B shows an example of cropping and resizing of FIG. 3A.

Figure 3C:
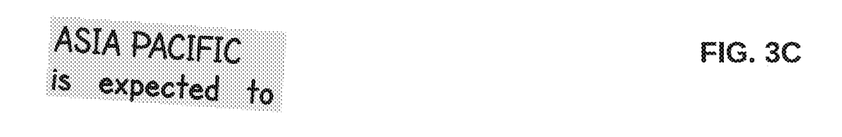

At 162, the cropped and resized image may be augmented in some way for training purposes. Selected augmentation may come from many different types of augmentation, for example, rotation, random affine transformation, random perspective transformation, random elastic transformation, random morphological operation, random Gaussian blurring, and random intensity inversion. Ordinarily skilled artisans will appreciate that there will be other types of augmentation that may be applied. A different augmentation may be applied at different iterations of input of a cropped and resized image. FIG. 3C shows an example of rotation of FIG. 3B.

Figure 3D:
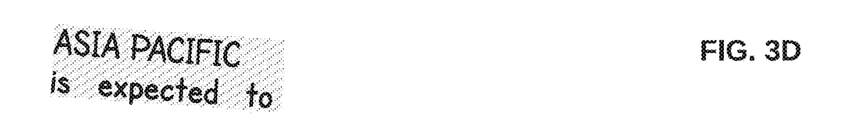

At 164, a mini-batch of the image may be constructed. In an embodiment, all the images in a mini-batch have the same height and width. As a result of the cropping at 160, the height may be made uniform after resizing. To achieve the same width, the original image may be pasted to a background image of desired size, to get the images in the mini-batch to the calculated maximum width. Thus, for example, after calculating the maximum image width of the above augmented images, smaller images may be padded horizontally to form an image mini-batch of uniform height and uniform width. FIG. 3D shows an example of padding the image.

Figure 3E:
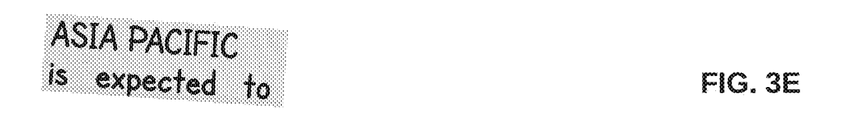

At 166, the image mini-batch may be augmented further. For example, some kind of noise may be introduced into the image. Types of noise may include Gaussian noise, impulse noise, Poisson noise, and speckle noise. Other types of noise may include fixed pattern noise, random noise, and banding noise. Examples of one or more of the above may include additive Gaussian noise, salt noise, pepper noise, or salt and pepper noise. In an embodiment, the noise may be introduced randomly. This listing is intended to be exemplary, not exhaustive. Ordinarily skilled artisans will appreciate that there are other types of noise which may be introduced. FIG. 3E shows an example of noise added to the image.

Additionally or alternatively, one or more image compression techniques, such as JPEG compression, may be applied randomly. In an embodiment, because the mini-batches are of a manageable size, selected from a training corpus of manageable size, these processes can be carried out with a CPU and its associated memory, rather than relying on input and output (I/O) processes from disk storage devices.

At 180, the augmented image mini-batch from 166 and the ground truth labels from 214 may be combined into a training batch and sent to the training procedure. In an embodiment, the processes described with respect to FIGS. 1A and 1B may be repeated until the entire contents of the corpus have been used for one or multiple iterations, or until a predetermined level of accuracy is reached. The desired level of accuracy may depend on the application, as ordinarily skilled artisans will appreciate.

Figure 4A:
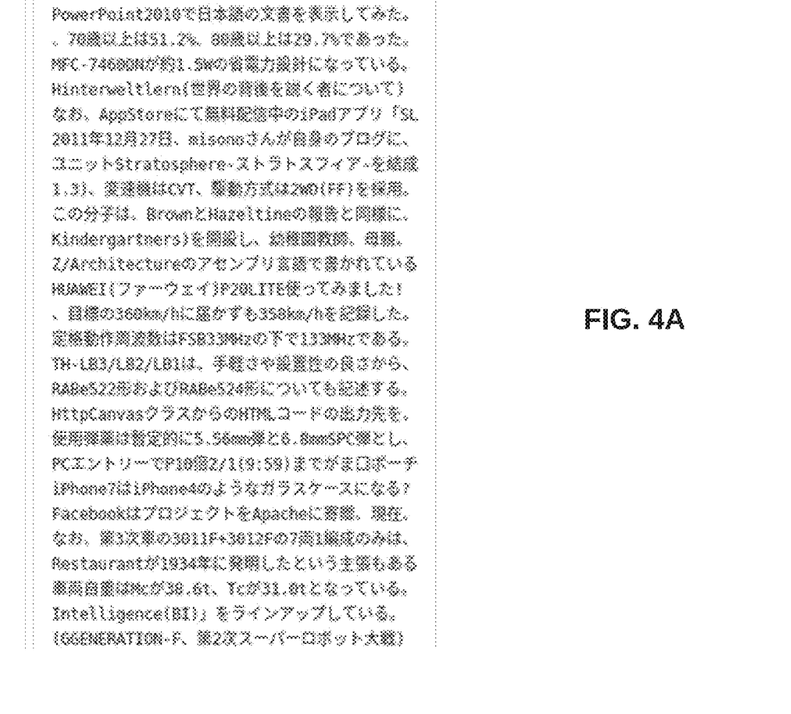
FIG. 4A is an example of ground truth labels in accordance with an embodiment.
Figure 4B:
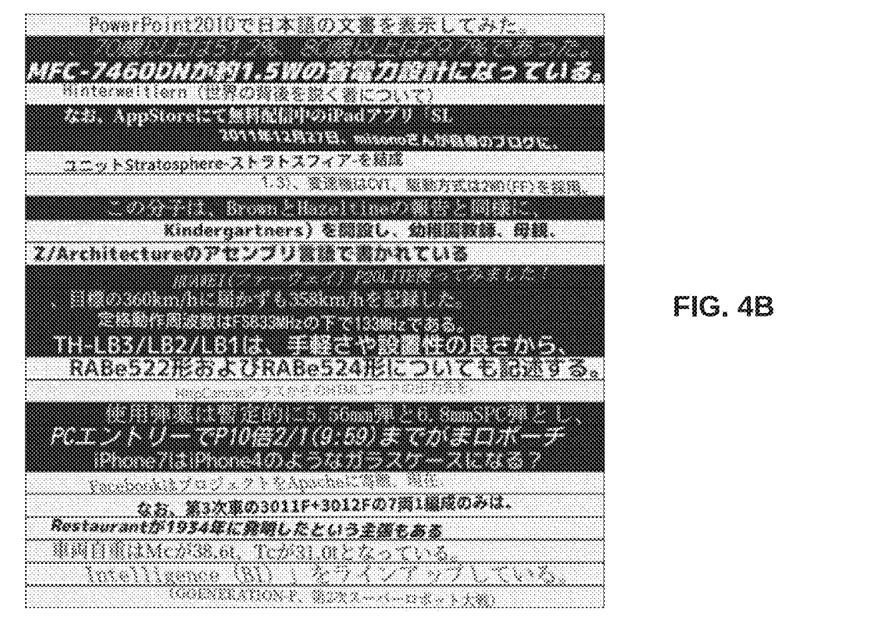
FIG. 4B is an example of image training data output according to an embodiment.

FIG. 4A shows an example of text from a corpus, as ground truth text corresponding to FIG. 2G, as an output at 114 in FIG. 1A. FIG. 4B shows an example of line images of a mini-batch generated according to embodiments of the invention, corresponding to FIG. 3E, as an output at 166 in FIG. 2B. FIGS. 4A and 4B together provide an example of mini-batches generated according to FIGS. 1A and 1B.

Figure 5A:
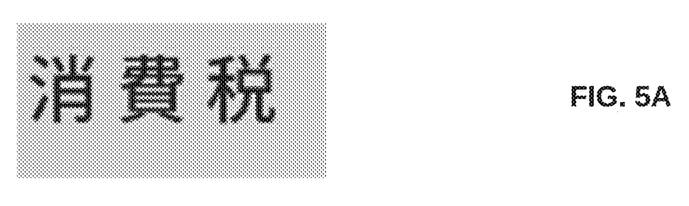
FIGS. 5A-5E correspond to FIGS. 3A-3E as an another example of sequential manipulation of data from a mini-batch as image training data according to embodiments.
Figure 5B:
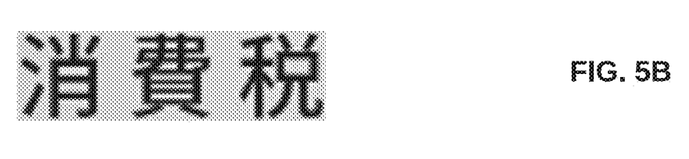
Figure 5C:
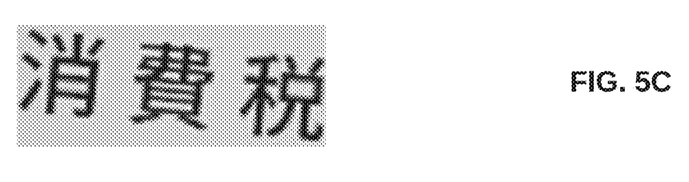
Figure 5D:
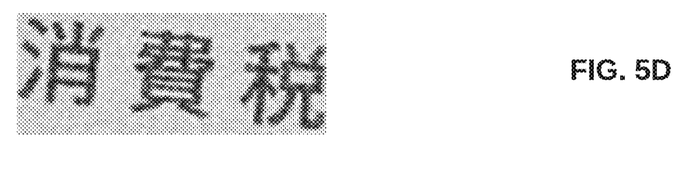
Figure 5E:
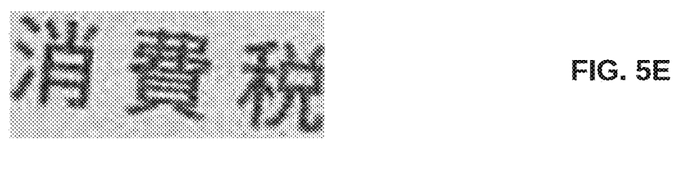

FIGS. 5A-5E correspond to FIGS. 3A-3E, respectively and show an example of image training data for another alphabet in accordance with embodiments. In FIG. 5A, a clean image is presented. In FIG. 5B, the image of FIG. 5A is cropped and resized, preserving the aspect ratio of the text in the image. In FIG. 5C, the image is rotated. At FIG. 5D, noise is added to the image. At FIG. 5E, the image is JPEG compressed. Not all of the manipulations in FIGS. 5A-5E are necessary to prepare a training image. However, the images in these various Figures illustrate how a training batch may be prepared, using various kinds of augmentation.

Through the foregoing processes, mini-batches of training samples, containing a list of pairs of training images and corresponding ground truth labels at each training iteration may be provided. In one aspect, the production is carried out in multiple processes asynchronously in a CPU, in parallel with the training procedure being performed in the training model on the GPU. All the data is generated in CPU random access memory (RAM), obviating the need for input from and output to any disk storage system associated with the CPU or GPU.

Figure 6:
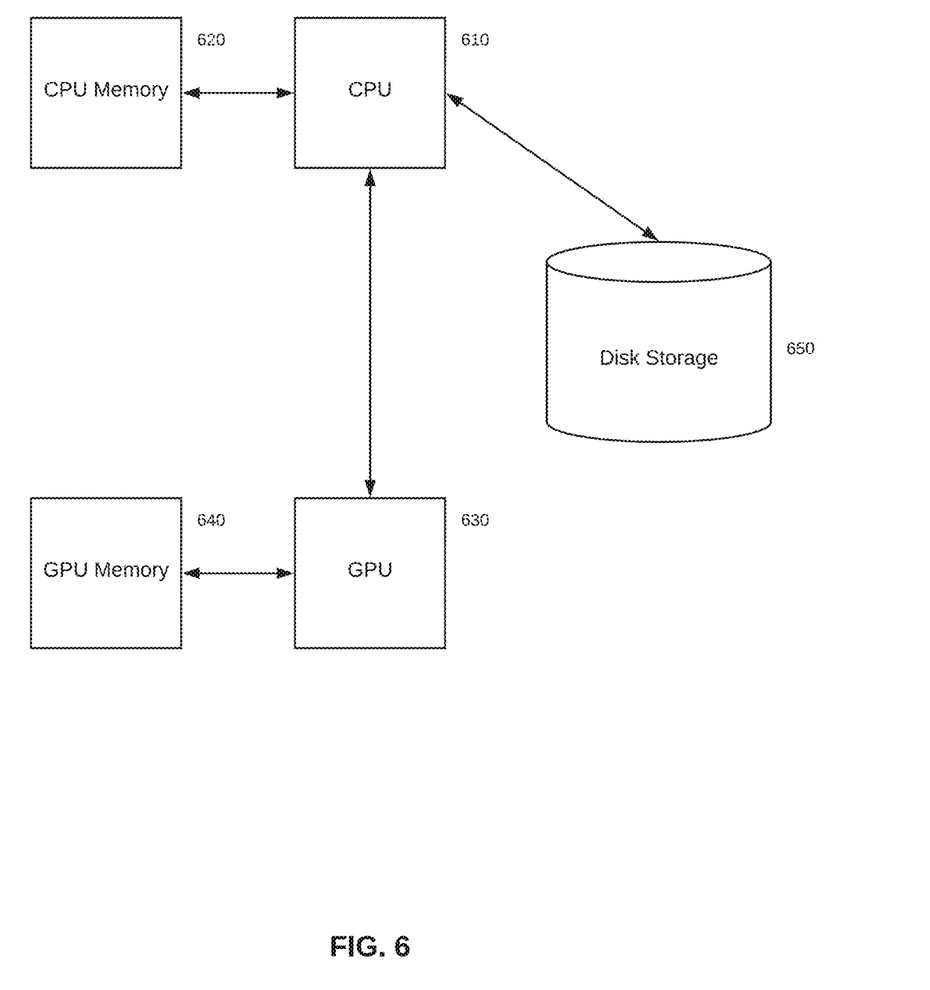
FIG. 6 is a high level diagram of a system for implementing aspects of the invention according to embodiments.

FIG. 6 is a high level diagram of a processing system for training a machine learning model for OCR according to an embodiment. In FIG. 6, one or more CPUs 610 communicate with CPU memory 620 and disk storage 650. The one or more CPUs 610 generate the mini-batches that are used for the training model which is implemented in one or more GPUs 630. In FIG. 6, GPU 630 is shown as communicating with GPU memory 640. Generally speaking, for purposes of the following discussion, a CPU may be understood to have a certain number of cores, each with a certain capability and capacity. A GPU may be understood to have a larger number of cores, in many cases a substantially larger number of cores than a CPU. In an embodiment, each of the GPU cores having a lower capability and capacity than that of the CPU cores.

In an embodiment, asynchronous operation for the CPU and GPU means that, while the GPU is at a certain point in training using a particular set of data, the CPU may be generating one or more future data sets for the GPU to use in training. In one aspect, the CPU may retrieve a next line of the lines input from the corpus, and perform the previously-described processing on that next line, to produce a longer line of mini-batches from which augmented image mini-batches are produced. in an embodiment, the CPU continue to work with a particular corpus line that has been grouped into the randomly shuffled mini-batches, may select another mini-batch that randomly-shuffled set, and perform the previously-described processing on that mini-batch. In an embodiment, the CPU may continue with the initially selected mini-batch and may perform the same processing, starting with augmentation of text, through application of another randomly selected font to provide a different rendered image, and different image augmentations. In any of these embodiments, the system works with text that already is in CPU memory, without having to access disk storage 650 to get more data.

Depending on the training model, the processing discussed above may be allocated among two or more CPUs, and/or two or more GPUs.

As alluded to earlier, the training model discussed herein may be a deep learning model, which may be implemented by one or more different types of neural networks. The types of neural networks and other deep learning models will be well known to ordinarily skilled artisans. Embodiments of the invention focus on the training data to be provided to such models.

According to one or more embodiments, the randomization of font selection enables increased visual variability of the training samples. Augmentation of text as described enables content variability as well as visual variability. All of this may be accomplished without requiring extensive storage and attendant I/O processes. Also, each time a text line is selected, that line can be rendered into different images because of font randomization, and text augmentation, and image augmentation. Besides font files, the only item that is stored is the training corpus (from which the text lines, images, mini-batches, and the like are retrieved), it is easy to vary training information even further by varying the training corpus.

While the foregoing describes embodiments according to aspects of the invention, the invention is not to be considered as limited to those embodiments or aspects. Ordinarily skilled artisans will appreciate variants of the invention within the scope and spirit of the appended claims.

What is claimed is:

1. A method comprising:
a. receiving a sequence of text lines from a corpus, each of the text lines having no more than a predetermined length;
b. grouping the text lines into mini-batches;
c. randomizing the mini-batches;
d. selecting a mini-batch;
e. converting the selected mini-batch into ground truth labels;
f. receiving a randomly selected font from a set of fonts;
g. rendering text lines in the selected mini-batch using the randomly selected font to produce an image of the text lines;
h. processing the image to produce an image mini-batch; and
i. outputting the ground truth labels and image mini-batch to a training model as training data.

2. A method according to claim 1, further comprising repeating a.-i. for the entire contents of the corpus.

3. A method according to claim 1, further comprising repeating a.-i. more than once for the entire contents of the corpus until the training model achieves a predetermined level of accuracy.

4. A method according to claim 1, wherein the receiving a sequence of text lines comprises receiving a sentence, segmenting that sentence into the text lines, and sorting the text lines according to length.

5. A method according to claim 1, further comprising augmenting the text in the selected mini-batch to produce an augmented mini-batch, and performing the converting and rendering on the augmented mini-batch.

6. A method according to claim 5, wherein augmenting the text comprises text processing selected from the group consisting of changing a case of one or more words in the text, converting one or more characters in the text between full-width and half-width, placing spaces between letters of one or more words in the text, placing additional spaces between one or more words in the text, and inserting or removing diacritic marks.

7. A method according to claim 1, wherein processing the image comprises cropping and resizing the image and augmenting the cropped and resized image.

8. A method according to claim 7, wherein augmenting the cropped and resized image comprises performing a process selected from the group consisting of rotation, random affine transformation, random perspective transformation, random elastic transformation, random morphological operation, random Gaussian blurring, and random intensity inversion.

9. A method according to claim 1, wherein the processing comprises augmenting the image mini-batch by introducing noise selected from the group consisting of Gaussian noise, impulse noise, Poisson noise, speckle noise, fixed pattern noise, random noise, and banding noise.

10. A method according to claim 1, wherein the processing comprises adding padding pixels so that the image mini-batch has a uniform length.

11. A system comprising:
a graphics processing unit (GPU), the GPU programmed to implement a training model;
GPU memory connected to the GPU;
a central processing unit (CPU), the CPU programmed to provide training data to train the training model to perform optical character recognition (OCR);
CPU memory connected to the CPU; and
non-volatile storage connected to the CPU and the GPU, the non-volatile storage storing a corpus of text;
the system including a program which causes the system to perform the following:
a. grouping a sequence of text lines from a corpus, each of the text lines having no more than a predetermined length, into mini-batches;

b. randomizing the mini-batches;
c. selecting a mini-batch;
d. converting the selected mini-batch into ground truth labels;
e. receiving a randomly selected font from a set of fonts;
f. rendering text lines in the selected mini-batch using the randomly selected font to produce an image of the text lines;
g. processing the image to produce an image mini-batch; and
h. outputting the ground truth labels and image mini-batch to a training model as training data.

12. A system according to claim 11, wherein the program causes the system to perform a.-h. for the entire contents of the corpus.

13. A system according to claim 11, wherein the program causes the system to perform a.-h. more than once for the entire contents of the corpus until the training model achieves a predetermined level of accuracy.

14. A system according to claim 11, wherein the receiving a sequence of text lines comprises receiving a sentence, segmenting that sentence into the text lines, and sorting the text lines according to length.

15. A system according to claim 11, wherein the program causes the system to perform the following:
augmenting the text in the selected mini-batch by performing text processing selected from the group consisting of changing a case of one or more words in the text, converting one or more characters in the text between full-width and half-width, placing spaces between letters of one or more words in the text, placing additional spaces between one or more words in the text, and inserting or removing diacritic marks, to produce an augmented mini-batch; and
performing the converting and rendering on the augmented mini-batch.

16. A system according to claim 11, wherein processing the image comprises cropping the image, resizing the image and adding padding pixels so that the image mini-batch has a uniform length, and augmenting the cropped and resized image.

17. A system according to claim 16, wherein augmenting the cropped and resized image comprises performing a process selected from the group consisting of rotation, random affine transformation, random perspective transformation, random elastic transformation, random morphological operation, random Gaussian blurring, and random intensity inversion.

18. A system according to claim 11, wherein processing the image comprises augmenting the image mini-batch by introducing noise selected from the group consisting of Gaussian noise, impulse noise, Poisson noise, speckle noise, fixed pattern noise, random noise, and banding noise.

19. A system according to claim 11, wherein the training model is a deep learning model.

20. A system according to claim 19, wherein the deep learning model is a neural network.

* * * * *